UNITED STATES PATENT OFFICE.

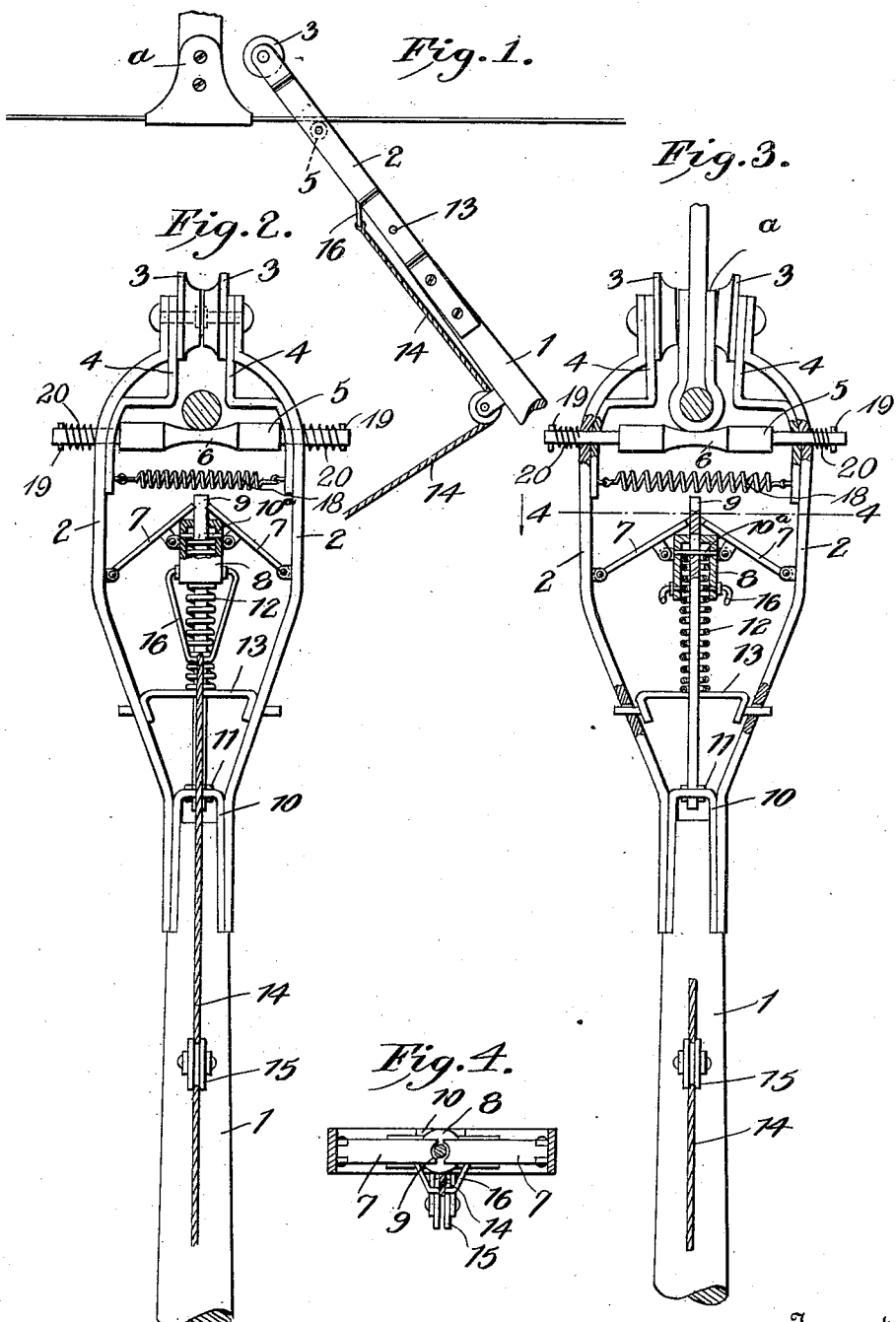

WILLIAM A. DECHANT, OF COLUMBUS, OHIO.

TROLLEY HARP OR POLE.

No. 914,338.  Specification of Letters Patent.  Patented March 2, 1909.

Application filed August 6, 1908. Serial No. 447,272.

*To all whom it may concern:*

Be it known that I, WILLIAM A. DECHANT, a citizen of the United States, residing at Columbus, in the county of Franklin and State of Ohio, have invented certain new and useful Improvements in Trolley Harps or Poles; and I do declare the following to be a full, clear, and exact description of the invention, such as will enable others skilled in the art to which it appertains to make and use the same.

My invention relates to improvements in trolley harps or poles.

It has for its object to provide for the automatic adjustment or accommodation of the harp or pole to the cable or wire suspending hanger or bracket during the transit of the car, and to carry out said ends in an effective and simple manner.

With these and other objects in view, the invention consists of certain novel features of construction, combination and arrangement of parts, as will be more fully described and particularly pointed out in the appended claims.

In the accompanying drawings illustrating the preferred embodiment of my invention, Figure 1 is a side elevation thereof as applied for use, parts being broken away; Fig. 2 is a front elevation of the same upon an enlarged scale; Fig. 3 is a similar view thereof showing the parts extended; and Fig. 4 is a horizontal section taken on the line 4—4 of Fig. 3.

In practicing my invention, I provide the usual pole or member 1 with upwardly extending lateral arms 2, suitably attached thereto and having arranged between their upper ends opposed rounded wheels 3 for forming contact between said arms above the cable or wire. Interposed between said wheels and said arms are bent plates 4, the lower ends of said plates being extended at right-angles to their upper portions and connected to the arms 2 of the member 1, thus reinforcing or bracing the overhanging upper ends of said arms. Hung in and between the arms 2 of the member 1 is a roll 5 preferably concaved centrally of its ends, as at 6 for the reception of, and engagement with the trolley wire or cable.

Plate members or links 7 are pivoted to the arms 2 at their lower ends and have their inner ends pivotally connected to an intermediate tubular member or cap 8, through which passes the upper end of a guiding member or slide 9 suitably held at its upper end, within said cap or tubular member as by a spring key 10$^a$ against displacement. The lower end of said slide or guiding member is passed through a preferably inverted approximately U-shaped strap or member 10 fastened to the trolley pole proper 2 at the upper end of the latter in any suitable way, said slide or guiding member being suitably held in said strap or keeper, preferably as shown, as by a spring key or pin 11. Upon said guiding stem or member 9 is arranged a spring 12 the pressure or tension of which is delivered upon the head or tubular member 8, in order to automatically hold the arms or links 7 in upwardly extended position for holding the arms of the pole member in their effective position, as when the wheels 3 are in engagement with each other. The guiding stem or member 9 is suitably held as against lateral displacement by a cross piece or bar 13 suitably interposed between the arms 2 of the pole member.

It will be noted that with the pole as applied for use, with its arms 2 arranged to extend above the trolley wire or cable and the wheels 3 in engagement with each other, and that as said wheels arrive opposite any one of the hangers or supports, *a*, on the trolley wire or cable, the arms 2 of the trolley pole will automatically separate and permit their passage by said hanger, while said arms automatically assume their initial position immediately upon passing said hanger or bracket under the action of the spring 9 delivering its pressure upon the links 7. It will also be noted that when it may be desired to separate the arms 2 of the trolley pole manually, a line 14 usually employed for that purpose may be suitably manipulated by the conductor of the car, said line passing over a pulley 15 suitably hung upon the pole, and passing upwardly and connected to a bale or link 16 in turn pivoted or connected to the head or tubular member 8.

In addition to the links, 7, and spring, 12, and the other parts co-acting therewith to hold the arms 2 in operative position, I also provide an additional holding device in the form of a coiled spring, 18, which is arranged between the arms, 2, immediately below the roller, 5, and has its opposite ends secured to said arms as shown. It will be noted that the shaft of the roller, 5, projects a suitable distance beyond the outer sides of the arms, 2, through which it passes, and said ends are provided with transversely disposed pins, 19, which prevent the shaft from becoming disengaged from eithes of the arms, 2. In addition to the spring, 18, I may also, if desired, employ other springs, 20, arranged on the outer ends of the roller shaft between the pins 19 and the outer sides of the arms, 2.

A trolley harp constructed in accordance with my invention will be found to be practical and efficient in operation, durable in construction and having its parts so arranged that the arms thereof will open automatically when passing hangers or obstructions on the wire, and will not permit the roller to be disengaged from the wire, said parts being also readily operated by the conductor or operator of the car to open the arms and thereby permit the harp to be engaged with or disengaged from the wire when desired.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described and ascertained the nature of my invention, what I claim as new and desire to secure by Letters-Patent, is:—

1. A device of the character described comprising a pole member having upwardly extending arms, a resilient connection between said arms adapted to permit of the automatic separation of said arms under pressure, and a roller rotatably mounted on the arms provided with compression springs adapted to be compressed when the arms are extended, said roller being adapted to engage with a trolley wire.

2. A device of the character described, a pole member provided with upwardly extending arms, means arranged between said arms for engagement with the trolley wire or cable, and a resilient connection between said arms, connecting links pivoted to said arms and to a head or tubular member, a slide or guiding member passing through said head or tubular member, a spring arranged upon said slide and adapted to deliver its pressure upon said head or tubular member, and means effecting connection between said guiding member and said pole member.

3. A device of the character described embracing a pole member having upwardly extending arms, means arranged on said arms for engagement with a trolley wire or cable, a head or tubular member having connections with an operating line and formed with an aperture for the reception of a guiding member, pivoted links interposed between said arms and connected to the head or tubular member, a guiding stem or slide extending through said head, a spring arranged upon said guiding stem and adapted to deliver its pressure upon said head, an approximately U-shaped member connected to said pole member, and having one end of said slide passing through it.

4. A device of the character described comprising a pole member having upwardly extending arms, a roll extending transversely between said arms for engaging with the trolley wire, a fixed guiding member extending longitudinally between said arms beneath the roll, a sliding member mounted upon the guiding member, a resilient element around the guiding member, to normally exert pressure upon the sliding member, connection between the sliding member and the arms of the pole member and manually operated means for moving the sliding member against the action of said spring.

In testimony whereof I have hereunto set my hand in presence of two subscribing witnesses.

WILLIAM A. DECHANT.

Witnesses:
WM. H. ADAMS,
PAUL FOERTSCH.